United States Patent [19]

Ishida et al.

[11] Patent Number: 4,784,007
[45] Date of Patent: Nov. 15, 1988

[54] METHOD AND APPARATUS FOR ACTUATING VEHICLE TRANSMISSION

[75] Inventors: Hisao Ishida, Tokyo; Masaki Ishihara, Kanagawa; Makoto Uriuhara, Yokohama, all of Japan

[73] Assignee: Isuzu Motors Limited, Tokyo, Japan

[21] Appl. No.: 20,200

[22] Filed: Feb. 27, 1987

Related U.S. Application Data

[63] Continuation of Ser. No. 861,640, May 8, 1986, abandoned, which is a continuation of Ser. No. 539,967, Oct. 7, 1983, abandoned.

[30] Foreign Application Priority Data

Oct. 7, 1982 [JP] Japan .................... 57-176696

[51] Int. Cl.⁴ .................................. F16H 5/40
[52] U.S. Cl. ...................... 74/335; 74/336 R; 74/869
[58] Field of Search ............ 74/335, 336 R, 337, 74/364, 365, 869

[56] References Cited

U.S. PATENT DOCUMENTS

| | | | |
|---|---|---|---|
| 2,931,237 | 4/1960 | Backus | 74/364 X |
| 2,952,346 | 9/1960 | Costa et al. | 74/364 X |
| 2,974,766 | 3/1961 | Perkins et al. | 74/364 X |
| 3,776,056 | 12/1973 | Espenschied | 74/364 |
| 3,793,898 | 2/1974 | Espenschied et al. | 74/335 |
| 3,808,903 | 5/1974 | Sauer | 74/335 |

FOREIGN PATENT DOCUMENTS 1386986 3/1975 United Kingdom .

Primary Examiner—Allan D. Herrmann
Assistant Examiner—David Novais
Attorney, Agent, or Firm—Staas & Halsey

[57] ABSTRACT

A vehicle transmission system has an internal lever for changing transmission gears, a select actuator for moving the internal lever to neutral positions N1, N2, N3 in a first direction, a shift actuator for moving the internal lever to 1st–5th gear positions and a reverse position in a second direction substantially normal to the first direction, and a clutch actuator for actuating a clutch. While any one of the actuators is in operation, the pressure of a fluid discharged from the operating actuator is prevented from acting on the select actuator and/or the shift actuator which is not in operation by applying a fluid pressure to the inoperative select actuator and/or the shift actuator to fix the actuator or actuators in a current position against operation, thereby allowing the transmission gears to be changed accurately and smoothly.

4 Claims, 4 Drawing Sheets

METHOD AND APPARATUS FOR ACTUATING VEHICLE TRANSMISSION

This is a continuation of co-pending application Ser. No. 861,640 filed on May 8, 1986 which is a continuation of co-pending application Ser. No. 539,967 filed Oct. 7, 1983 both abandoned.

BACKGROUND OF THE INVENTION

The present invention relates to a method of and an apparatus for actuating a vehicle transmission for use in an automobile.

Vehicles, typically automobiles, powered by internal combustion engines have a transmission coupled between the engine and driven wheels for effective utilization of output power from the engine. In operation, one of the different gear ratios of the transmission is selected to meet the particular vehicle speed. For example, when the vehicle is to run at a low speed, a larger gear ratio is used to cause the engine to operate at a high speed.

Several transmissions are known in the art. One known type is a parallel-gear transmission comprising a plurality of parallel gears, some of which are axially movable for changing gear ratios, and an internal level for shifting different gears into meshing engagement. For a transmission having five-speed and one-reverse gear positions, the internal lever is shiftable between three neutral positions N1, N2 and N3 in a row in a Y direction, between 1st and 2nd positions in an X direction normal to the Y direction across the neutral position N1, between 3rd and 4th positions in the X direction across the neutral position N2, and between the 5th and reverse positions in the X direction across the neutral position N3. Therefore, the internal lever is movable along the path composed of two "H"s partially overlapping each other.

There has recently been put to use a transmission system having a hydraulic drive mechanism controlled by an electronic control unit for automatically driving the internal lever. The transmission system has a select actuator for driving the internal lever selectively into the neutral position N1, N2 and N3 in the Y direction, and a shift actuator for driving the internal level selectively into the 1st through 5th and reverse positions in the X direction. When the transmission gear is to be changed from the 2nd position to the 3rd position, the electronic control unit operates automatically to enable the shift actuator to move the internal lever in the X direction into the neutral position N1, then cause the select actuator to move the internal lever from the neutral position N1 to the neutral position N2 in the Y direction, and finally enable the shift actuator to move the internal lever from the neutral position N2 to the 3rd position in the X direction. Each of the actuators for automatically driving the internal lever comprises a hydraulic cylinder and a piston slidably disposed therein and movable into three positions, that is two end positions and one intermediate position, in response to a hydraulic pressure introduced into cylinder chambers defined one on each side of the piston. For moving the piston to the right, the hydraulic pressure is supplied into the cylinder chamber on the lefthand side of the piston, while the fluid in the righthand cylinder chamber is forced by the piston to return through a discharge passage into a tank. To permit the transmission to operate smoothly and prevent members of the transmission such as a shift fork from being worn quickly, the actuators will be released of any hydraulic pressure after the gear changing operation has been finished. The discharge passages from the actuators are connected in common. In the case where an automatic clutch is incorporated, the discharge passage of its actuator is also coupled in common to the discharge actuators of the transmission actuators. One disadvantage with such an automatic transmission system is that while the internal lever is being shifted by the shift actuator from one of the gear positions to the neutral position, the hydraulic pressure in the discharge passages is varied by the fluid discharged from the shift actuator, and such pressure variation tends to act on the select actuator and actuate the latter. This impairs smooth operation of the shift actuator since the select actuator is liable to apply forces to the internal lever perpendicular to the direction in which the internal lever is shifted by the shift actuator. The above shortcoming could be avoided by providing the select and shift actuators with independent discharge passages. However, this proposal is disadvantageous in that the entire fluid discharge piping would become complex.

SUMMARY OF THE INVENTION

Accordingly, it is an object of the present invention to provide a method of and an apparatus for actuating a vehicle transmission including a plurality of actuators which are successively actuatable for changing transmission gears while preventing the pressure of the fluid discharged by one of the actuators being operated upon from actuating the other actuators in error.

Another object of the present invention is to provide a method of and an apparatus for actuating a vehicle transmission in a vehicle having a plurality of hydraulic units with their discharge passages connected in common actuatable for operating various components of the vehicle while preventing the pressure of the fluid discharged by one of the hydraulic units from operating actuators of the transmission in error.

According to the present invention, the above objects can be achieved by a method of and an apparatus for actuating a parallel-gear transmission of a vehicle having a plurality of gears and an internal lever for changing gear rations, a hydraulically-controlled select actuator for actuating the internal lever in a select direction, a hydraulically-controlled shift actuator for actuating the internal lever in a shift direction, the select and shift actuators having fluid discharge passages connected in common to each other and, if necessary, to the fluid discharge passages of other hydraulic units in the vehicle. The select actuator and the shift actuators are alternately actuated to change the gear ratios. While the hydraulic units are in operation, the select and shift actuators which remain inactivated are subjected to hydraulic pressure so as to be fixed in the current operative positions thereof.

The above and other objects, features and advantages of the present invention will become more apparent from the following description when taken in conjunction with the accompanying drawings in which a preferred embodiment of the present invention is shown by way of illustrative example.

BRIEF DESCRIPTON OF THE DRAWINGS

DESCRIPTION OF THE PREFERRED EMBODIMENTS

Figure 1:
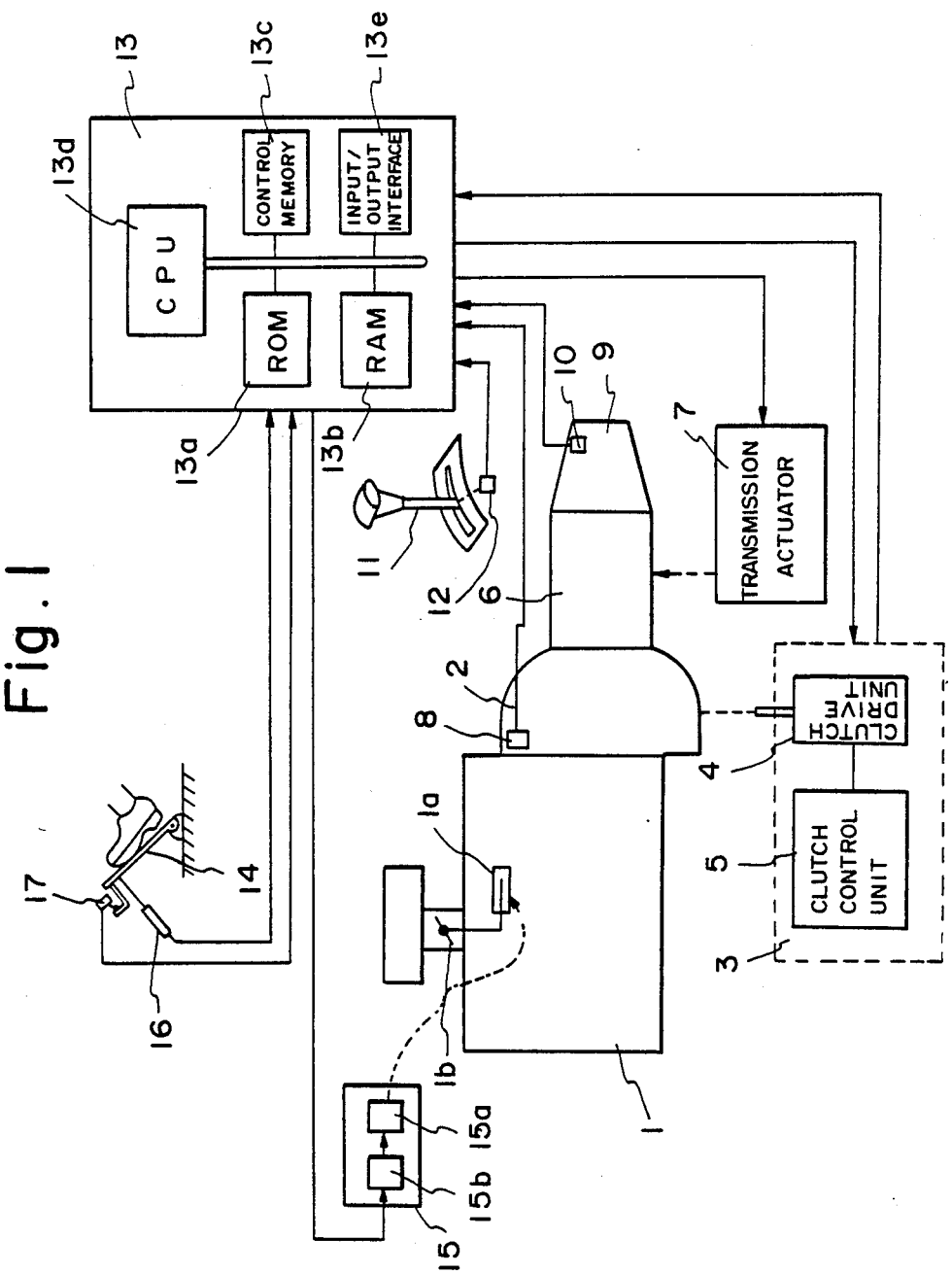
FIG. 1 is a block diagram schematically showing an engine, a transmission, a clutch, and an electronic control device therefor in a vehicle.

FIG. 1 schematically shows in block diagram an engine, a transmission, a clutch, and an electronic control device therefor. A gasoline engine 1 has a throttle actuator 1a is operatively coupled to a throttle valve 1b for actuating the same. A clutch 2 is operatively connected to the engine and actuatable by a clutch actuator 3 composed of a clutch drive unit 4 and a clutch control unit 5. A parallel-gear transmission 6 is operatively connected to the clutch 2 and actuatable by a transmission actuator 7. The rotation of the engine 1 is detected by an engine rotation sensor 8. A wheel driving mechanism 9 is operatively coupled with the transmission 6 and includes a propeller shaft, a universal joint, and other components (not shown). A car speed sensor 10 is disposed in the wheel driving mechanism 9. A drive control lever 11 serves to actuate a position switch 12 which issues a signal to an electronic control device 13. In response to the signal from the position switch 12, the electronic control device 13 delivers a signal dependent on the position of the control lever 11 to the transmission actuator 7 for selecting a gear ratio of the transmission 6 according to the applied signal. The vehicle also has an acelerator pedal 14, a throttle control unti 15, a potentiometer 16 for detecting the degree of depression of the accelerator pedal 14, and an idling switch 17. The throttle control unit 15 includes a driver 15a for actuating the throttle valve 1b and a controller 15b for controlling the driver 15a. The throttle control unit 15 is responsive to a signal from the potentiometer 16 for controlling the opening of the throttle valve 1b dependent on the depression of the accelerator pedal 14.

The electronic control device 13 comprises: a read-only memory 13a for storing a sequence program for controlling operation of the engine 1, data for controlling gear changes in the transmission 6, data for controlling actuation of the clutch 2, and other necessary data; a random-access or data memory 13b for storing the results of arithmetic operations, input data; and other data, a control memory 13c for storing a control program; a central processing unit 13d for effecting arithmetic operations and processing data under the control of the control program and the sequence program; and an input/output interface 13e. According to the present invention, the electronic control device 13 controls engine control parameters such as the rate of supply of fuel to the gasoline engine 1, ignition timing, and exhaust gas recirculation to meet engine operating conditions, and, in addition, controls the clutch 2 and the gear changes in the transmission 6. For the clutch and transmission control, the read-only memory 13a stores data for connecting and disconnecting the clutch 2 and data for controlling the gear changes in the transmission 6.

The electronic control device 13 receives outputs from the potentiometer 16, the position switch 12, and the car speed sensor 10 successively through the input/output interface 13e into the data memory 13b. The central processing unit 13 computes and detemines an optimum gear ratio in response to the depression of the accelerator pedal 14, the indication by the control lever 11, the speed of the automobile or the engine, which are indicated by the received data. The gear change and clutch control data which correspond to the determined gear ratio are then read out of the read-only memory 13a and issued through the input/output interface 13e to the transmission actuator 7 and the clutch actuator 3. The transmission actuator 7 and the clutch actuator 3 are then driven by the supplied data to operate the transmission 6 and the clutch 2 for effecting a desired gear change. The electronic control device 13 carries out such data reception, gear ratio determination, and issuance of control data at all times so that the transmission 6 will operate at an optimum gear ratio at all times.

Figure 2:
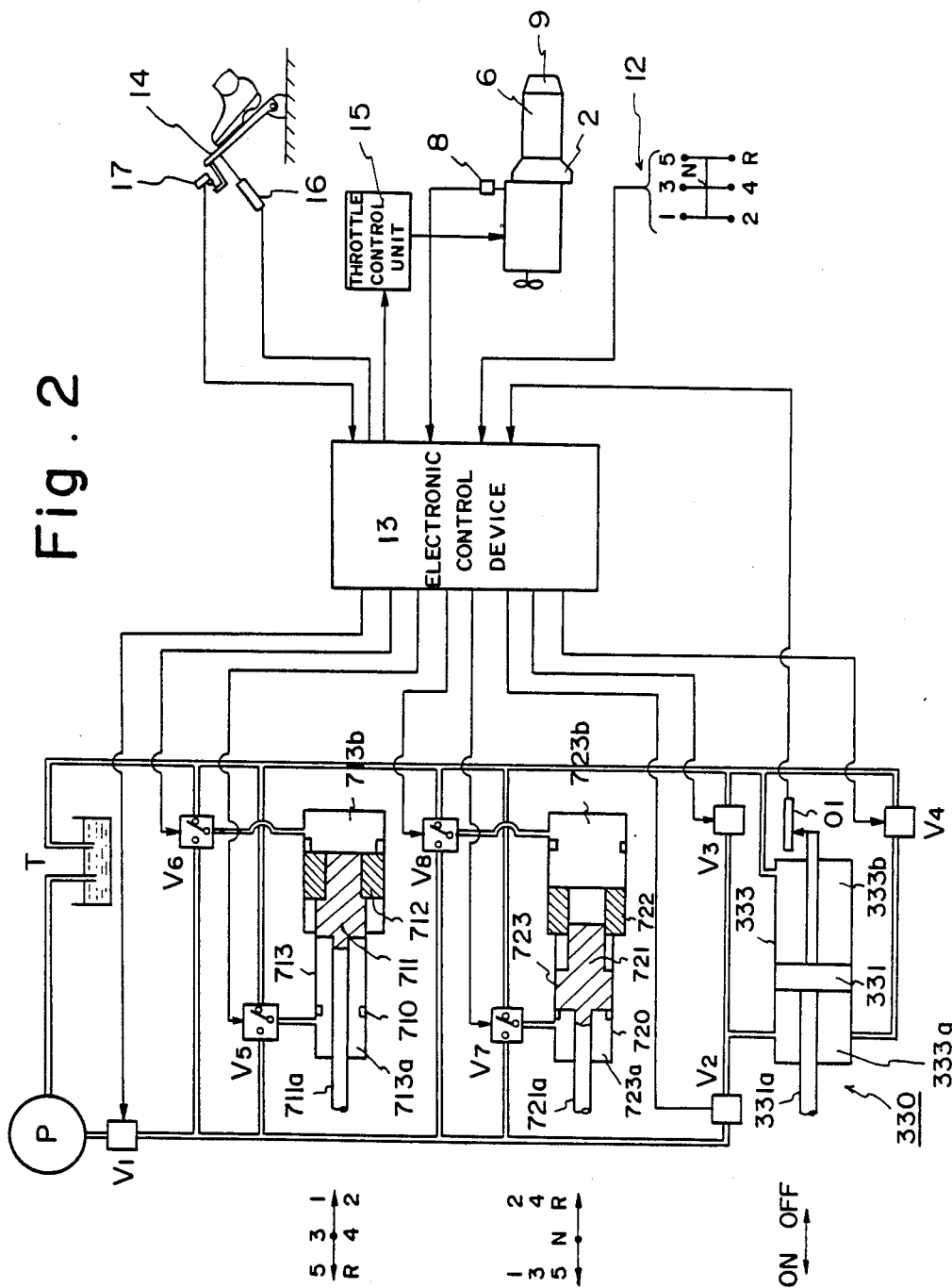
FIG. 2 is a circuit diagram of a hydraulic circuit arrangement of transmission actuators and a clutch actuator.

FIG. 2 shows a hydraulic circuit arrangement of the transmission actuator 7 and the clutch actuator 3. The circuit arrangement includes a select actuator 710, a shift actuator 720, a clutch actuator 330, switching valves V1 through V4, directional control valves V5 through V8, a pump P, and a tank T. The 1st through 5th gear positions are designated by 1 through 5, the neutral position by N, and the reverse gear position by R. The clutch connecting and disconnecting positions are indicated by ON and OFF, respectively. FIG. 3(B) illustrates the gear positions in greater detail, there being there neutral positions N1, N2 and N3.

The select and shift actuators 710, 720 can provide three stop positions, and comprise: stepped cylinders 713, 723, respectively; first pistons 711, 721, respectively, disposed slidably therein; and tubular second pistons 712, 722 fitted over the first pistons 711, 721, respectively, and disposed slidably in the cylinders 713, 723, respectively. The first pistons 711, 721 have piston rods held in engagement with an internal lever (not shown) of the transmission 6. The select and shift actuators 710, 720 are in the illustrated neutral positions when a fluid pressure acts in each of chambers 713a, 713b and 723a, 723b in the stepped cylinders 713, 723 of the actuators 710, 720. When the chambers 713a, 723a are pressurized, the first pistons 711, 721 together with the second pistons 712, 722 are moved to the right (FIG. 2). When the fluid pressure acts in the chambers 713b, 723b, only the first pistons 711, 721 are moved leftward (FIG. 2).

The chambers 713a, 713b in the select actuator 710 are held in fluid communication through the directional control valves V5, V6, respectively, with the pump P (also through the switching valve V1) and the tank T.

The chambers 723a, 723b in the shift actuator 720 are held in fluid communication through the directional control valves V7, V8, respectively, with the pump P (also through the switching valve V1) and the tank T.

The clutch actuator 330 comprises a cylinder 333, a piston 331 disposed slidably therein, and a piston rod 331a having one end connected to the piston 331 and an opposite end connected to an actuator lever (not shown) of the clutch 2. The cylinder 333 has a chamber 333a communicating with the pump P through the switching valves V1, V2 and with the tank T through the switching valve V3 and the switching valve V4 which is controlled to be opened and closed cyclically. The cylinder 333 also has a chamber 333b kept in fluid communication with the tank T at all times.

The piston 331, the piston rod 331a, and the cylinder 333 jointly constitute and clutch drive unit 4, and the switching valves V2, V3, V4 jointly constitute the clutch control unit 5.

Figure 3A:
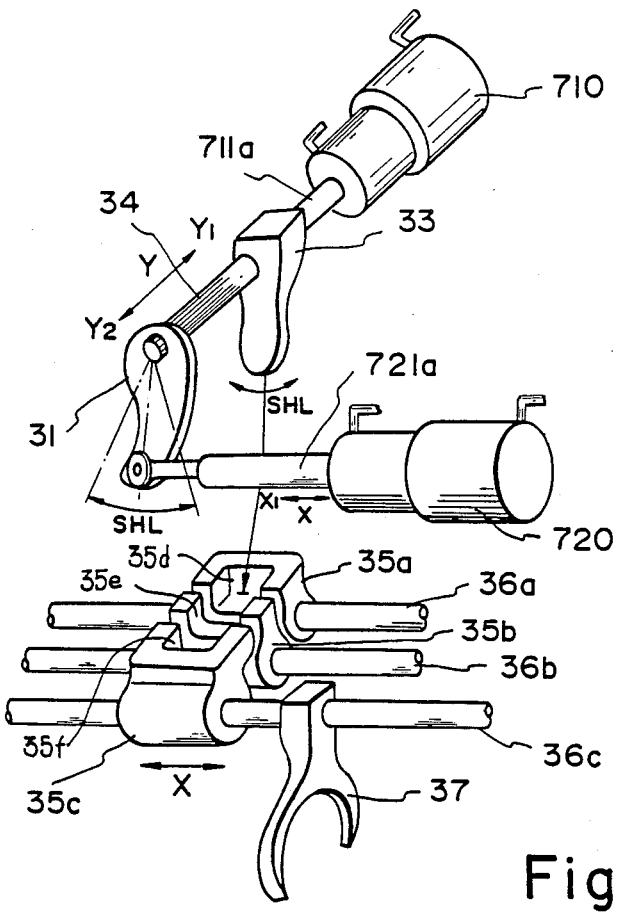
FIG. 3(A) is an exploded perspective view illustrative of a portion of the internal construction of the transmission.
Figure 3B:
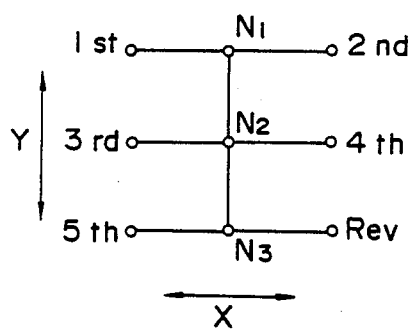
FIG. 3(B) is a diagram showing a pattern of movement of an internal lever.

As illustrated in FIG. 3(A), the select actuator 710 and the shift actuator 720 are arranged in mutually perpendicular relationship. The select actuator 710 includes a rod 711a to which there is securely attached an internal lever 33 movable in a Y direction on movement of the rod 711a in the Y direction. A shift lever 31 is splined to the rod 711a at an end thereof for corotation therewith, and is movable in the Y direction along the rod 711a. The rod 711a can be turned about its own axis in response to angular movement of the shift lever 31. The shift lever 31 is pivotably joined to the end of the rod 721a of the shift actuator 720, which is movable in an X direction. Accordingly, when the shift actuator 720 is actuated to move the rod 721a axially, the shift lever 31 is angularly moved to turn the rod 711a of the select actuator 720 about its own axis. The internal lever 33 can therefore be moved in the Y direction by the rod 711a, and turned in an SHL direction by the shift lever 31. The internal lever 33 has a distal end engaging in, one at a time, slots 35d, 35e, 35f in shift blocks 35a, 35b, 35c fixed respectively to shift rods 36a, 36b, 36c. In response to axial movement of the rod 711a of the select actuator 710, the end of the internal lever 33 can traverse the slots 35d-35f and is positioned in a desired one of the slots 35d-35f. The angular movement of the shift lever 31 causes one of the shift blocks which is engaged by the internal lever 33 to move in the X direction. A shift fork 37 (only one shown) is mounted on each of the shift rods 36a, 36b, 36c. The movement of a desired one of the shift blocks forces the corresponding shift rod and hence the shift fork to move until a clutch sleeve (not shown) is actuated, whereupon desired gears are brought into meshing engagement, and the previously meshing gears are separated out of mesh with each other, thereby effecting a gear change. More specifically, the internal lever 33 is movable to three positions in the Y direction by axial movement of the rod 711a of the select actuator 710, and also to three positions in the X direction by angular movement of the shift lever 31 caused by axial movement of the rod 721a of the shift actuator 720. Thus, the internal lever 33 can assume a total of nine positions. One of the shift blocks 35a, 35b, 35c is selected when the internal lever 33 is placed in a corresponding one of the three positions in the Y direction or select direction. The selected shift block is moved in the X direction or shift direction when the internal lever 33 is angularly moved to one of the positions in the X direction. The above nine positions correspond to the 1st, 2nd, 3rd, 4th, 5th positions, the reverse position Rev, and the neutral positions N1, N2, N3, as shown in FIG. 3(B), of a manual change lever. Therefore, the select direction is defined as the direction in which the internal lever 33 can be moved between the neutral positions N1, N2, N3. The and the shift direction is defined as the direction in which the internal lever 33 is movable from the 1st, 2nd, 3rd, 4th, 5th positions and the reverse position Rev to the neutral positions N1, N2, N3, or vice versa. The internal lever 33 is movable along the path defined by two partially overlapping "H"s connecting the nine positions in response to the movement of the shift lever 31 in the X direction and the movement of the rod 711a in the Y direction, and can stably be retained in one of the nine positions at a time. For example, when the 1st gear position is to be selected while the internal lever 33 is in the neutral position N2, the rod 711a of the select actuator 710 is actuated to move the internal lever 33 in the direction of the arrow Y1, as illustrated in FIG. 3, and the shift lever 31 is turned clockwise about the rod 711a to turn the internal lever 33 clockwise to move the shift block 35a in the direction of the arrow X1, thereby selecting the 1st gear position. Although in FIG. 3(A) the select actuator 710 and the shift actuator 720 are arranged perpendicularly to each other, they may be positioned parallel to each other.

Operation of the transmission control system thus constructed will be described.

Figure 4:
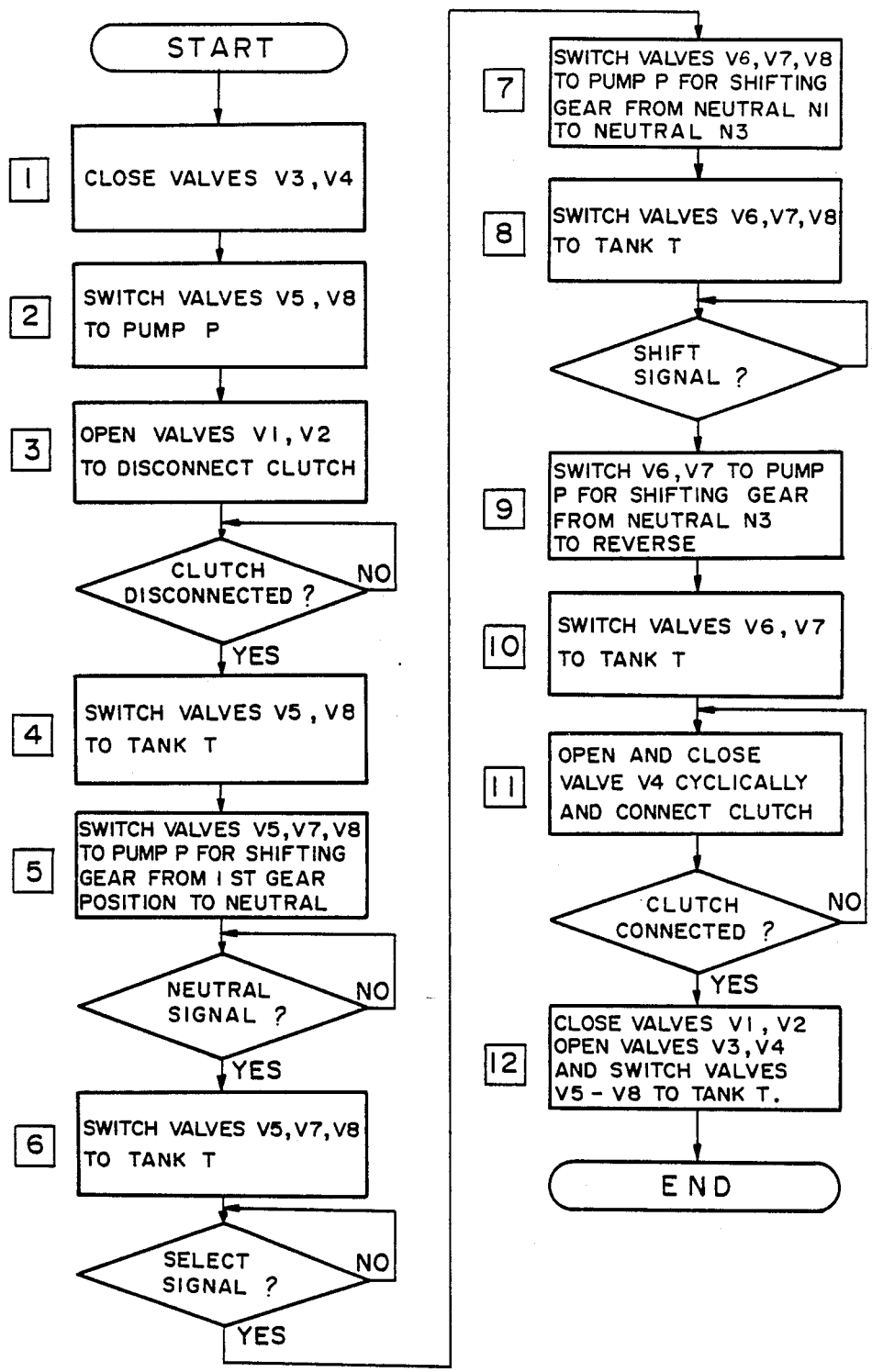
FIG. 4 is a flowchart showing progressive steps of operation of the electronic control device.

As an example, the transmission is to be shifted from the 1st gear position to the reverse position Rev as when the vehicle is to be backed into a garage. FIG. 4 is a flowchart illustrative of successive steps of operation of the transmission actuator 7 and the clutch actuator 3 when shifting gears from the 1st gear position to the reverse position Rev. The operation will be described primarily with reference to FIG. 4. In FIG. 2, the internal lever 33 of the transmission 6 is in the 1st gear position. In this position, the switching valve V1 is closed, the switching valves V2, V3, V4 are open, the directional control valves V5, V6, V7, V8 are in communication with the tank T which is vented to the atmosphere, and no hydraulic pressure acts on the select actuator 710 and the shift actuator 720. The vehicle is moving slowing with the accelerator pedal 14 depressed slightly. When the accelerator pedal 14 is released to stop and then back the vehicle, the release of the accelerator pedal 14 is detected by the electronic control device 13 which issues a signal to disconnect the clutch 2. In response to this signal, the switching valves V3, V4 are closed at a step 1, and simultaneously the directional control valves V5, V8 are switched to the pump P at a step 2. The above valve operation is in preparation for applying the fluid pressure to the chamber 713a in the select actuator 710 and the chamber 723b in the shift actuator 720 when the switching valve V1 is opened, for thereby operating the select and shift actuators 710, 720 into the position of FIG. 2. Then, the switching valves V1, V2 are opened to pressurize the chamber 333a for moving the piston 331 in the clutch actuator 330 to the right (FIG. 2), thus disconnecting the clutch 2 at a step 3. Since the select and shift actuators 710, 720 are already in the position shown in FIG. 2, they will not be moved under the fluid pressure acting thereon from the chamber 333b in the clutch actuator 330. When the clutch 2 is disconnected, the switching valve 2 is closed, and the directional control valves V5, V8 are switched to the tank T at a step 4.

Then, the directional control valve V5 is switched to the pump P, and the directional control valves V7, V8 are also switched to the pump P in a step 5. This valve operation brings the select actuator 710 into the fixed position, and causes the shift actuator 720 to shift the internal lever 33 from the 1st gear position to the neutral position N1 until the step of the first piston 721 abuts against the second piston 722 to stop the rod 721a in the central position.

When the transmission gears are returned to the neutral position N, the directional control valves V5, V7, V8 are switched to the tank T at a step 6.

Thereafter, the directional control valves V7, V8 are switched to the pump P to secure the shift actuator 720 in the neutral position N, and at the same time the directional control valve V6 is switched to the pump P to pressurize the chamber 713b to force the second piston 712 against the step of the stepped cylinder 713 and the first piston 711 to the lefthand end shown in FIG. 2 at a step 7. The internal lever 33 is now brought to the neutral position N3 in which the transmission can be shifted to the 5th gear position or the reverse position Rev. The fluid discharged from the chamber 713a in the select actuator 710 at this time cannot get the shift actautor 720 into motion as the latter is in the fixed position.

Upon completion of the above step, the directional control valves V6, V7, V8 are switched again to the tank T at a step 8.

The directional control valve V7 is then switched to the pump P, and the directional control valve V6 is also switched to the pump P at a step 9. In response to this valve opeation, the select actuator 710 is fixed and the shift actuator 720 actuated to move the internal lever 33 from the neutral postion N3 to the reverse position Rev. Thereafter, the directional control valves V6, V7 are switched again to the tank T, thereby finishing the gear shifting operation from the 1st gear position to the reverse position Rev at a step 10.

With the transmission gears in the reverse position Rev, the accelerator pedal 14 is depressed to enable the electronic control device 13 to issue a command to the clutch control unit 5 for opening and closing the switching valve V4 cyclically to release the fluid pressure in the chamber 333a in the clutch actuator 330 gradually. The clutch 2 is now forced under its own spring resiliency to move the piston rod 331a slowly to the left (FIG. 2) until the clutch 2 is returned to the engaging or connected postion at a step 11. The vehicle now starts moving slowly backward into the garage. When the clutch 2 is fully connected, the vehicle backs at a speed dependent on the depression of the accelerator pedal 14. The switching valve V1 is closed (the switching valve V2 remains closed), and the directional control valves V5, V6, V7, V8 are switched to the tank T while the switching valves V3, V4 remain open, thus releasing the actuators of any fluid pressure at a step 12. The fluid pressure release prevents the shift fork from being subjected to wear which would otherwise be caused by any remaining cylinder fluid pressure acting on the shift fork to be pushed against the reverse gear.

In the clutch connecting operation at the step 11, the select and shift actuators 710, 720 are not fixed as the clutch 2 is slowly connected. However, these actuators may be fixed in position under applied fluid pressure when the clutch 2 is connected.

With the arrangement of the present invention, while the shift actuator 720 is actuated to shift the internal lever 33 from the current gear position to the neutral position for a gear changing operation, the select actuator 710 is actuated to keep the internal lever 33 in a select position corresponding to current gear position. Therefore, no pressure variation from the hydraulic circuit is applied to the select actuator 720, and hence no undesired force acts which would tend to obstruct the operation of the shift actuator 720 to shift the internal lever 33 toward the neutral position. Accordingly, the shift actuator 720 can shift the internal lever 33 smoothly.

Although a certain preferred embodiment has been shown and described, it should be understood that many changes and modifications may be made therein without departing from the scope of the appended claims.

What we claim is:

1. A method of actuating a vehicle parallel-gear transmission having a plurality of gears and an internal lever for moving shift blocks connected with shift rods and shift forks for changing gear ratios of the transmission, a hydraulically controlled select actuator operatively connected to said internal lever for moving said internal lever in a select direction, a hydraulically controlled shift actuator operatively connected to said internal lever for moving said internal lever in a shift direction substantially normal to said select direction, and a common fluid discharge passage connected to fluid discharge ports of said select and shift actuators, the select and shift actuators being alternately actuatable to effect a gear changing operation, said method comprising the steps of, in order:

(a) applying a hydraulic pressure to said select actuator in a position, to fix said select actuator in that position;

(b) applying a hydraulic pressure to said shift actuator to actuate same, so as to move the internal lever to a first neutral position;

(c) removing the hydraulic pressure from said select and shift actuators;

(d) applying a hydraulic pressure to said shift actuator in a position, to fix said shift actuator in that position;

(e) applying a hydraulic pressure to said select actuator to actuate same, so as to move the internal lever to a second neutral position;

(f) removing the hydraulic pressure from said select and shift actuators;

(g) applying a hydraulic pressure to said select actuator in a position, to fix said select actuator in that position;

(h) applying a hydraulic pressure to said shift actuator to actuate same, so as to move the internal lever and engage a desired gear ratio of the transmission; and (i) removing the hydraulic pressure from said select and shift actuators to free both the select and shift actuators and prevent wear of the transmission gears.

2. A method of actuating a vehicle parallel-gear transmission having a plurality of gears and an internal lever for moving shift blocks connected with shift rods and shift forks for changing gear ratios of the transmission, a hydraulically controlled select actuator operatively connected to said internal lever for moving said internal lever in a select direction, a hydraulically controlled shift actuator operatively connected to said internal lever for moving said internal lever in a shift direction substantialy normal to said select direction, a hydraulically controlled clutch actuator for connecting and disconnecting a clutch of the transmission, and a common fluid discharge passage connected to fluid discharge ports of said select and shift actuators and a fluid discharge port of said clutch actuator, the select and shift actuators being alternately actuatable to effect a gear changing operation, said method comprising the steps of, in order:

(a) applying a hydraulic pressure to said select and shift actuators, each in a position, to fix the actuators in the respective positions while the transmission is in a first gear ratio;

(b) actuating said clutch actuator, thereby disconnecting the clutch;

(c) removing the hydraulic pressure from said select and shift actuators;

(d) applying a hydraulic pressure to said select actuator in a position, to fix said select actuator in that position;

(e) applying a hydraulic pressure to said shift actuator to actuate same, so as to move the internal lever to a first neutral position;

(f) removing the hydraulic pressure from said select and shift actuators;

(g) applying a hydraulic pressure to said shift actuator in a position, to fix said shift actuator in that position;

(h) applying a hydraullic pressure to said select actuator to actuate same, so as to move the internal lever to a second neutral position;

(i) removing the hydraulic pressure from said select and shift actuators;

(j) applying a hydraulic pressure to said select actuator in a position, to fix said select actuator in that position;

(k) applying a hydraulic pressure to said shift actuator to actuate same, so as to move the internal lever and engage a desired gear ratio of the transmission;

(l) actuating the clutch actuator, thereby connecting the clutch, and, prior to or following step (1);

(m) removing the hydraulic pressure from said select and shift actuators to free both of the select and shift actuators and prevent wear of the transmission gears.

3. A method of actuating a vehicle parallel-gear transmission having a plurality of gears and an internal lever for moving shift blocks connected with shift rods and shift forks for changing gear ratios of the transmisssion, a hydraulically controlled select actuator operatively connected to said internal lever for moving said internal lever in a select direction, a hydraulically controlled shift actuator operatively connected to said internal lever for moving said internal lever in a shift direction substantially normal to said select direction, and a common fluid discharge passage connected to fluid discharge ports of said select and shift actuators, the select and shift actuators being alternately actuatable to effect a gear changing operation, said method comprising the steps of, in order:

(a) applying a hydraulic pressure to said select actuator in a position, to fix said select actuator in that position;

(b) applying a hydraulic pressure to said shift actuator to actuate same, so as to move the internal lever to a first neutral position;

(c) removing the hydraulic pressure from said select actuator;

(d) applying a hydraulic pressure to said select actuator to actuate same, so as to move the internal lever to a second neutral position;

(e) removing the hydraulic pressure from said shift actuator;

(f) applying a hydraulic pressure to said shift actuator to actuate same, so as to move the internal lever and engage a desired gear ratio of the transmission; and (g) removing the hydraulic pressure from said select and shift actuators to free both of the select and shift actuators and prevent wear of the tranmission gears.

4. A method of actuating a vehicle parallel-gear transmission having a plurality of gears and an internal lever for moving shift blocks connected with shift rods and shift forks for changing gear ratios of the transmission, a hydraulically controlled select actuator operatively connected to said internal lever for moving said internal lever in a select direction, a hydraulically controlled shift actuator operatively connected to said internal lever for moving said internal lever in a shift direction substantially normal to said select direction, a hydraulically controlled clutch actuator for connecting and disconnecting a clutch of the transmission, and a common fluid discharge passage connected to fluid discharge ports of said select and shift actuators and a fluid discharge port of said clutch actuator, the select and shift actuators being alternately actuatable to effect a gear changing operation, said method comprising the steps of, in order:

(a) applying a hydraulic pressure to said select and shift actuators, each in a position, to fix the actuators in the respective positions while the transmission is in a first gear ratio;

(b) actuating said clutch actuator, thereby disconnecting the clutch;

(c) removing the hydraulic pressure from said shift actuator;

(d) applying a hydraulic pressure to said shift actuator to actuate same, so as to move the internal lever to a first neutral position;

(e) removing the hydraulic pressure from said select actuator;

(f) applying a hydraulic pressure to said select actuator to actuate same, so as to move the internal lever to a second, neutral position;

(g) removing the hydraulic pressure from said shift actuator;

(h) applying a hydraulic pressure to said shift actuator to actuate same, so as to move the internal lever and engage a desired gear ratio of the transmission;

(i) actuating the clutch actuator, thereby connecting the clutch, and, prior to or following step (1);

(j) removing the hydraulic pressure from said select and shift actuators to free both of the select and shift actuators and prevent wear of the transmission gears

* * * * *